United States Patent

Koivunen

[15] 3,642,097
[45] Feb. 15, 1972

[54] ENGINE AND TRANSMISSION FLUID SUPPLY SYSTEM

[72] Inventor: Erkki A. Koivunen, Livonia, Mich.
[73] Assignee: General Motors Corporation, Detroit, Mich.
[22] Filed: Oct. 22, 1970
[21] Appl. No.: 82,893

[52] U.S. Cl..................................184/6 R, 60/54, 60/DIG. 3, 74/645, 74/730
[51] Int. Cl...................................F16d 33/06, F16h 47/00
[58] Field of Search....................74/645, 730; 60/DIG. 3, 54; 184/6, 6 U; 123/186

[56] References Cited

UNITED STATES PATENTS

| | | | |
|---|---|---|---|
| 2,651,179 | 9/1953 | Blood | 184/6 X |
| 3,505,907 | 4/1970 | Fox et al. | 74/732 X |
| 3,554,056 | 1/1971 | Cole | 74/645 X |
| 3,566,999 | 3/1971 | Robinson | 60/54 X |

*Primary Examiner*—Manuel A. Antonakas
*Attorney*—W. E. Finken, A. M. Heiter and R. L. Phillips

[57] ABSTRACT

A vehicle power train, an engine and a transmission having a common fluid supply provided by a pump which is driven by the engine, a pressure regulator valve that regulates the pressure of the fluid supplied by the pump and delivers excess flow to a hydrodynamic torque converter in the transmission, a valve that delivers flow from the converter to lubricate the engine and prevents flow in the opposite direction and a lubricant control valve that delivers controlled fluid flow from the pump to lubricate the engine below a predetermined engine lubrication pressure and at a higher predetermined engine lubrication pressure blocks fluid flow from the pump to lubricate the engine and then delivers fluid from the converter to lubricate the transmission.

3 Claims, 3 Drawing Figures

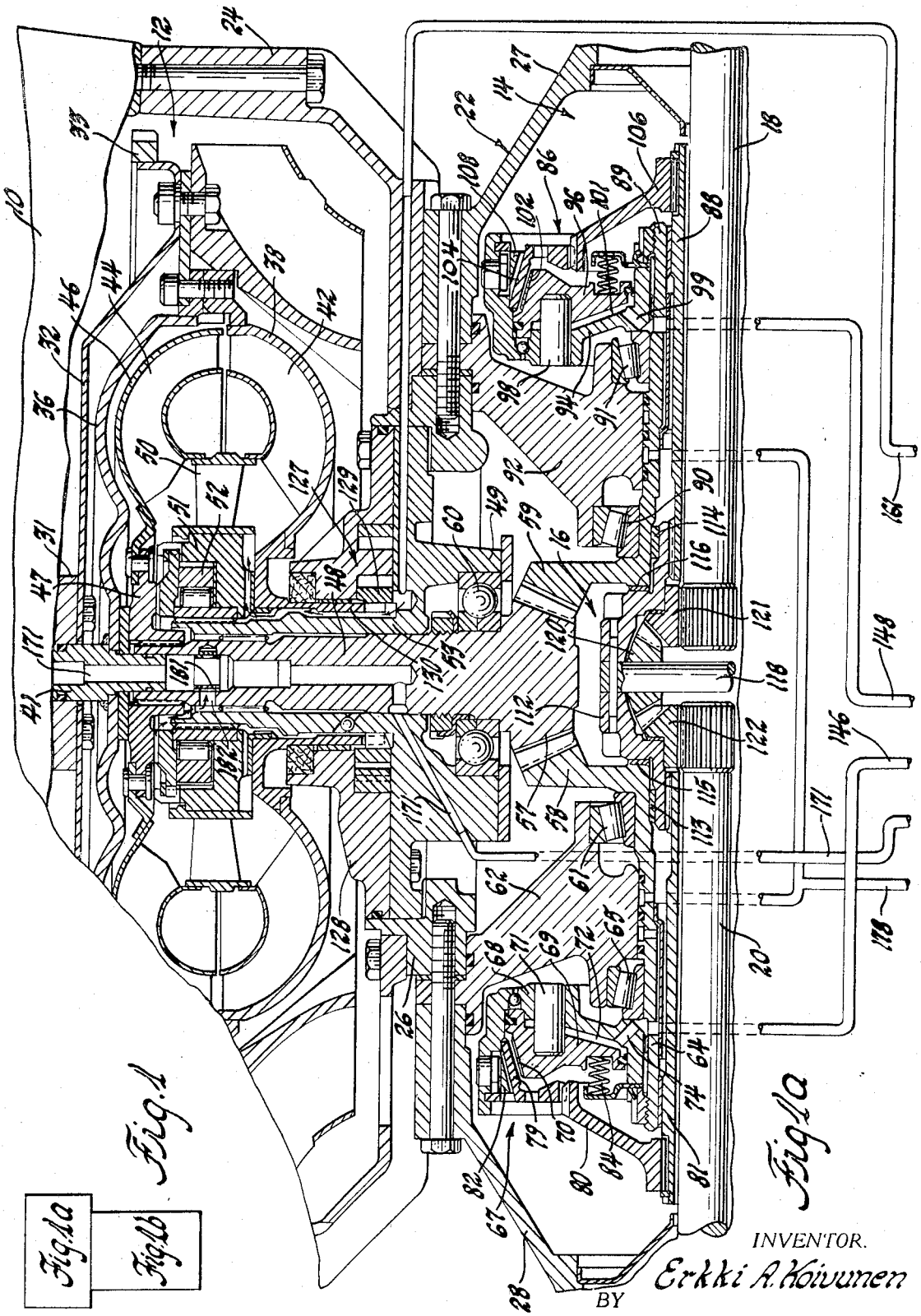

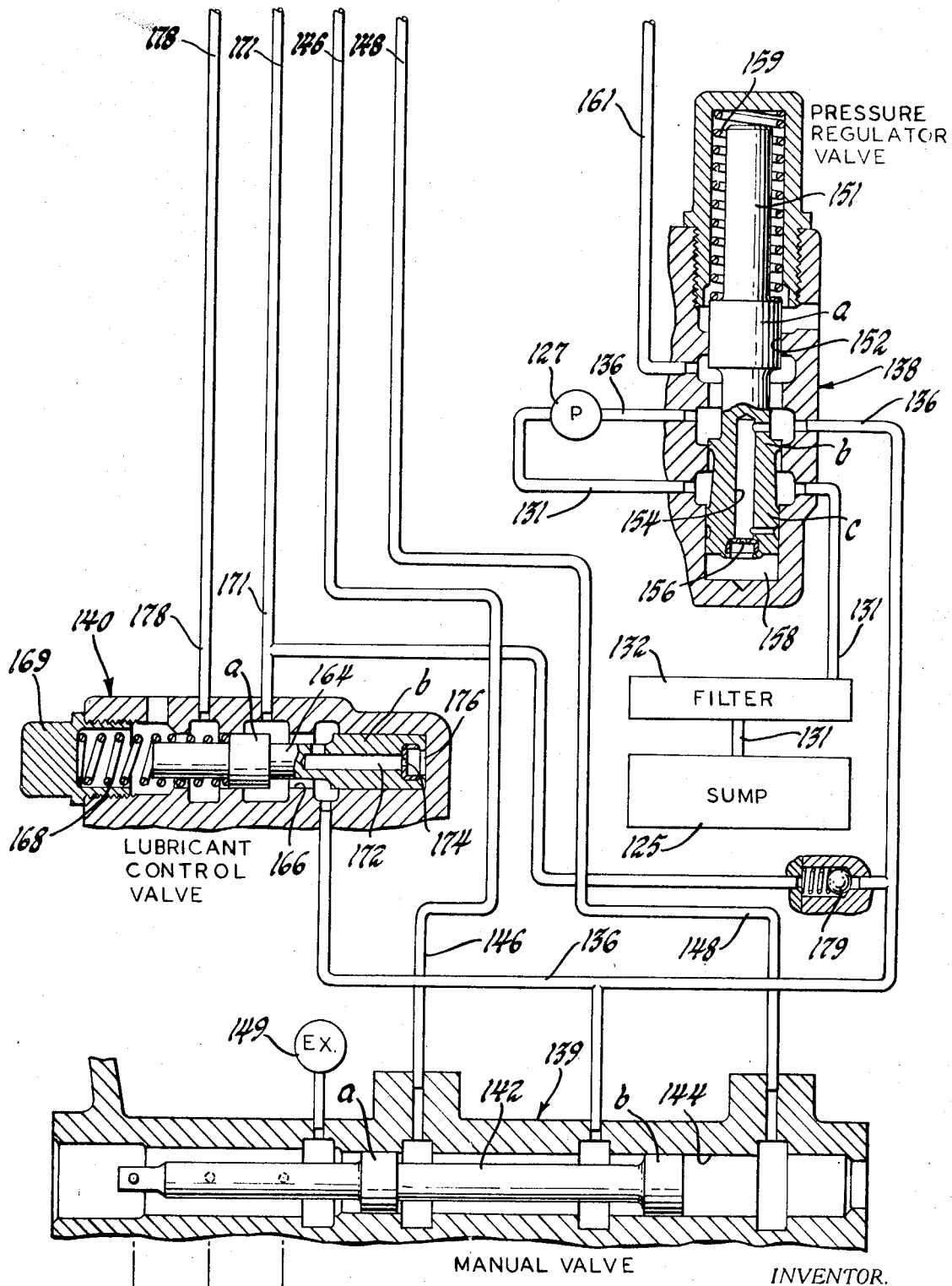

ENGINE AND TRANSMISSION FLUID SUPPLY SYSTEM

This invention relates to an engine and transmission fluid supply system and more particularly to an engine and transmission fluid supply system which initially supplies fluid for engine lubrication and directs fluid to lubricate the transmission after the engine requirements are satisfied.

The fluid supply system according to the present invention is for supplying both the engine and transmission in a vehicle power train wherein these power train components use a common fluid. The system comprises a pump which is continuously driven by the engine to supply fluid under pressure. A pressure regulator valve regulates the pressure of the fluid supplied by the pump at a predetermined value for transmission drive selection control and delivers any excess fluid to a hydrodynamic torque converter in the transmission. A check valve provides for delivering fluid from the converter to lubricate the engine and prevents flow in the opposite direction. A lubricant control valve provides for delivering fluid from the pump to lubricate the engine below a predetermined engine lubrication pressure. When this pressure tends to be exceeded, the lubricant control valve throttles this flow and pump pressure builds to the value determined by the pressure regulator valve. The pressure regulator valve delivers the excess pump flow to the converter from which it flows through the check valve to increase the engine lubrication pressure after having filled the converter. The engine lubrication pressure then increases at a predetermined higher value, the lubricant control valve blocks the direct flow from the pump to lubricate the engine and then delivers fluid from the converter to lubricate the transmission in addition to supplying the engine.

An object of the present invention is to provide a new and improved fluid supply system for supplying both the engine and transmission in a vehicle power train.

Another object is to provide in a vehicle power train a fluid supply system which on engine startup directs fluid to lubricate the engine and on engine pressure buildup directs fluid to fill a hydrodynamic torque converter in the transmission from which the fluid is then delivered to the engine and on further transmission pressure buildup also delivers fluid from the converter to lubricate the transmission.

Another object is to provide in a fluid supply system for an engine and transmission of a vehicle power train an input-driven pump whose fluid output is normally pressure regulated by a valve that delivers excess fluid to fill a hydrodynamic torque converter in the transmission wherein all of the pump output is initially delivered to lubricate the engine and on engine pressure buildup fluid is then delivered with normal supply pressure regulation to fill the torque converter from which fluid is delivered to the engine and wherein on continued transmission pressure buildup is also supplied from the converter to lubricate the transmission.

These and other objects of the present invention will be more apparent from the following description and drawing in which:

FIG. 1 shows the relationship between FIG. 1a which is a partial sectional view of a vehicle power train and FIG. 1b which is a schematic view of a fluid supply system for supplying this power train.

The fluid supply system according to the present invention is for use with vehicle power trains of the type shown in FIG. 1a in which the engine and transmission use a common fluid. The vehicle power train comprises an internal combustion engine 10 whose power is transmitted to drive the vehicle by a drive train generally comprising a transmission having a hydrodynamic torque converter 12 and a forward and reverse transaxle unit 14. In the transaxle unit 14 there is a differential gearing unit 16 with the output from the drive train being transmitted by a pair of drive axle shafts 18 and 20. The axle shafts 18 and 20 are connected to drive the vehicle's driving wheels, not shown, which may be either the vehicle's forward or rear wheels, the vehicle power train being suitable for location in either the front or rear end of the vehicle. All of the drive train components are housed in a housing generally designated as 22. Housing engine comprises a converter housing 24 which is bolted to engine 10 and houses the converter 12, a central transaxle housing 26 which is bolted to converter housing 24 and houses the central portion of transaxle unit 14 including differential gearing 16 and axle housings 27 and 28 which are bolted to the opposite ends of housing 26 and house the axle shafts 18 and 20, respectively. Axle housings 27 and 28 also cooperate with the central transaxle housing 26 to complete the housing of the transaxle unit 14. The drive train housing 22 provides rigid support for the drive train components wherein the central axis of engine 10 and that of torque converter 12 are aligned and extend longitudinally of the vehicle and the central axis of the forward and reverse transaxle unit 14 and those of axle shafts 18 and 20 are aligned and extend transverse of the vehicle.

Describing now the details of the power train components starting with the input, the engine's crankshaft 31 is bolted to a drive plate 32 on which is mounted the engine starter gear 33. The plate 32 provides a flexible drive connection between the engine crankshaft and the hydrodynamic torque converter 12. The converter 12 comprises a rotary housing provided by a front cover 36 and a rear cover 38 which are bolted together and are also bolted to the drive plate 32. The front cover 36 has a hub 41 fixed thereto which is piloted in the end of crankshaft 31. The rear cover member 38 carries pump blades 42 which on rotation pump fluid to turbine blades 44 that are carried by a shell 46. The turbine blade shell 46 has a hub 47 that is splined to the front end of a converter output shaft 48 which extends into the central transaxle housing 26 through a bulkhead 49 that is bolted to housing 26. Fluid exiting from turbine blades 44 is directed back to the pump blades 42 by stator blades 50 which are mounted on a hub 51. Hub 51 is mounted by a one-way brake 52 on a sleeve portion 53 of the bulkhead 49. The hydrodynamic torque converter 12 is a three-element converter of conventional design and when filled with fluid provides torque-multiplying operation from stall up to coupling speed and fluid coupling operation thereafter to drive the converter output shaft 48.

Drive from the converter 12 to the transaxle unit 14 is provided by right angle drives comprising a beveled pinion 57 which is formed on the rear end of converter output shaft 48 and meshes at diametrically opposite sides with a pair of beveled gears 58 and 59 whose axes of rotation are at right angles to the rotational axis of pinion 57. An antifriction bearing 60 rotatably supports pinion 57 and thus the rear end of converter output shaft 48 in the bulkhead 49. The left-hand bevel gear 58 is rotatably supported by an antifriction bearing 61 in a bulkhead 62 which is bolted together with the axle housing 28 to the central transaxle housing 26. The hub of gear 58 has a sleeve portion 64 which is supported near its left-hand end in bulkhead 62 by an antifriction bearing 65, this bearing also supporting other rotary parts as will now be described. The gear 58 serves as the input member to a forward drive clutch generally designated as 67 which comprises a rotary housing 68 that is splined at its hub to sleeve portion 64 of gear 58. An annular piston 69 having a cone-shaped friction surface 70 is mounted in a cylinder formed in housing 68 and is prevented from rotating relative to this housing by a pin 71, the piston and cylinder forming an expansible chamber 72. Piston 69 is moved leftward on delivery of fluid pressure to chamber 72 through a port 74 in housing 68 to engage the friction surface 70 with the interior conical surface of an output clutch member 79. Output clutch member 79 is splined to a hub 80 that is in turn splined at its inner radius to the left-hand end of a sleeve shaft 81 located intermediate sleeve portion 64 and axle shaft 20, the output clutch member 79 being backstopped by the conically shaped interior of a collar 82 that is secured to housing 68. When the forward drive clutch 67 is engaged, the gear 58 is clutched to drive the shaft 81 in a direction which produces forward vehicle motion and thus this direction will be called the forward direction. A plurality of circumferentially spaced coil springs 84 retract the piston 69 to its release position when the fluid pressure in chamber 72 is exhausted through port 74.

A reverse drive clutch 86 whose structure is like that of the forward drive clutch 67 is for clutching the gear 59 to drive a sleeve shaft 88 through which the axle shaft 18 extends. Since the gear 59 rotates in a direction opposite that of gear 58, the sleeve shaft 88 rotates in a direction opposite that of sleeve shaft 81 to provide for driving the vehicle in reverse. The drive to reverse drive clutch 86 is provided by a sleeve portion 89 of gear 59 that is supported by antifriction bearings 90 and 91 in a bulkhead 92 that is bolted together with the right-hand axle housing 27 to the central transaxle housing 26. Sleeve portion 89 is connected to a rotary clutch housing 94 having a cylinder in which is mounted an annular piston 96 that is prevented from rotating relative thereto by a pin 98. When fluid pressure is supplied through a port 99 in housing 94 to a chamber 101 the piston 96 is urged rightward to engage its cone-shaped friction surface 102 with the interior conical surface of an output clutch member 104. Output clutch member 104 is splined to a hub 106 that is in turn splined to the right-hand end of sleeve shaft 88, the output clutch member 104 being backstopped by the conically shaped interior of a collar 108 that is secured to housing 94.

The differential gearing 16 comprises a carrier 112 which is located between bevel gears 58 and 59 and is splined to the inboard ends of sleeve shafts 81 and 88. The carrier 112 is supported for rotation about an axis aligned with the axes of gears 58 and 59 by sleeve bearings 113 and 114 while axial movement is limited by thrust bearings 115 and 116 located between the inboard sides of these gears and the outboard sides of the carrier. The carrier 112 supports a shaft 118 which is at right angles to the axis of carrier 112. Beveled spider gears 120 are rotatably mounted at spaced positions on the shaft 118, only one bevel spider gear 120 being shown, and mesh at diametrically opposite sides with beveled side gears 121 and 122 whose axes of rotation are at right angles to the axis of the spider gears. The side gears 121 and 122 are splined to the inboard ends of the axle shafts 18 and 20, respectively. The gearing of differential unit 16 is thus of a conventional type and operatively connects the two axle shafts while dividing the input force from the carrier equally between them and permitting one axle shaft to rotate faster than the other.

Thus, it can be seen that when the forward drive clutch 67 is engaged both of the axle shafts 18 and 20 are driven in a direction producing forward motion of the vehicle by the drive going through the differential gearing 16. Alternatively, engagement of the reverse drive clutch 86 produces opposite or reverse rotation of the axle shafts 18 and 20 and thus reverse drive of the vehicle.

A fluid supply system according to the present invention is shown in FIG. 1b and provides for fluid pressure delivery to selectively engage the forward drive clutch 67 and reverse drive clutch 86 to thus control the transmission drive and also provides for supplying the fluid to lubricate both the engine and the transmission. Both the engine and the transmission use a common oil of a suitable type which is returned from these components to a sump 125 via various exhausts and fluid return passages in the system, the sump being secured to the underside of the transmission housing 22. Fluid pressure for the system is supplied by a positive displacement pump 127 which is shown in sectional detail in FIG. 1a and schematically in FIG. 1b. The pump 127 is of the internal-external gear type and is housed in a pump housing 128 bolted to the converter side of bulkhead 49. The pump's drive gear 129, which is the external toothed gear, is keyed to a hub portion 130 of the rear cover 38 so that the pump is driven when the vehicle's engine is running. The engine-driven pump 127 draws oil from sump 125 through an intake passage 131 having a filter 132 therein. The oil is delivered from pump 127 to a main pressure supply passage 136 which is always connected to deliver oil to a main pressure regulator valve 138, a manual valve 139, and a lubricant control valve 140.

The manual valve 139 determines the operation of the transmission drive arrangement and comprises a spool valve element 142 having spaced lands $a$ and $b$ of equal diameter located in bore 144 of the system's valve body. The valve element 142 is movable to three positions which are forward (F), neutral (N), and reverse (R). The valve element 142 is adapted at its left-hand end to be operated through suitable linkage by the operator of the vehicle who manually selects the valve's position.

When the valve element 142 is in the F position, as shown, main pressure supply passage 136 is connected between lands $a$ and $b$ to a fluid passage 146 that is connected by the port 74 to chamber 72 of the forward drive clutch 67. Simultaneously, a fluid passage 148 which is connected by the port 99 to chamber 101 of the reverse drive clutch 86 is exhausted past the right-hand end of land $b$. Thus, in the forward drive position of the manual valve, oil pressure is delivered to engage the forward drive clutch 67 while the reverse drive clutch 86 is disengaged. When valve element 142 is moved to the N position, the main pressure supply passage 136 is blocked at the manual valve between lands $a$ and $b$ while the fluid passages 146 and 148 are exhausted past the left- and right-hand ends of the lands $a$ and $b$, respectively, exhaust of the fluid passage 146 being through an exhaust port 149. Thus, neither one of the clutches is engaged in neutral. When valve element 142 is moved to the R position, main pressure supply passage 136 is connected between lands $a$ and $b$ to the fluid passage 148 to engage the reverse drive clutch 86 while the fluid passage 146 is connected past the left-hand end of land $a$ to exhaust port 149 so that the forward drive clutch 67 is released.

The main pressure regulator valve 138 regulates the pressure in main pressure supply passage 136 and comprises a spool valve element 151 having spaced lands $a$, $b$ and $c$ of equal diameter located in a bore 152 of the valve body. The oil in main pressure supply passage 136 is always delivered to valve element 151 between lands $a$ and $b$ and then through a valve element passage 154 having a flow restriction 156 therein to a chamber 158. Pressure in chamber 158 acts to bias the valve element 151 upward against the bias of a spring 159 resulting in the pressure in the main pressure supply passage 136 being regulated at a valve determined by the spring bias with the overage being first exhausted between lands $a$ and $b$ to a converter feed passage 161 and then between lands $b$ and $c$ to the pump intake passage 131 on continued upward valve movement. The converter feed passage is connected to deliver oil to the converter 12 as shown by the arrows in FIG. 1a.

The lubricant control valve 40 controls the supply of oil to lubricate both the engine and transmission and comprises a spool valve element 164 having spaced lands $a$ and $b$ of equal diameter located in a bore 166 of the valve body. A spring 168 whose preload is determined by a threaded spring seat member 169 normally urges valve element 164 rightward to the position shown in which the main pressure supply passage 136 is connected between lands $a$ and $b$ to an engine lube supply passage 171. Passage 171, as shown in FIG. 1a, passes through bulkhead 49 and then centrally through converter output shaft 48 and hub 41 to deliver the oil to lubricate the engine 10. The valve bore 166 between lands $a$ and $b$ is always connected to the engine lube supply passage 171 and also through a passage 172 having a flow restriction 174 therein to a chamber 176 at the right-hand end of bore 166. Pressure in chamber 176 urges the valve element 164 leftward against the bias of spring 168 to control the size of the opening between the main pressure supply passage 136 and the engine lube supply passage 171 to regulate the pressure in the engine lube supply passage 171 according to the spring bias. When the pressure in the engine lube supply passage 171 is caused to exceed this regulated pressure by a predetermined amount as described in more detail later, the pressure then acting in chamber 176 moves the valve element 164 sufficiently leftward to close off the main pressure supply passage 136 with land $b$. Then on continued pressure increase in passage 171 and thus in chamber 176 to a predetermined value, the valve element 164 is caused to move sufficiently leftward to connect the engine lube supply passage 171 between lands $a$ and $b$ to a transmission lube supply passage 178 that is connected to deliver oil to lubricate the transmission components as shown in FIG. 1a. A spring-biased pressure regulator bypass valve 179 is operable to connect the main pressure supply passage 136 directly to the engine lube supply passage 171 thus bypassing the lubricant control valve 140 when the pressure in the former passage exceeds that in the later passage by a predetermined amount.

Oil delivery to the engine lube supply passage 171 is also provided by a reed-type check valve 181 that is located in converter output shaft 48 as shown in FIG. 1a. The reed valve 181 is operable to open to deliver oil from the converter 12 via a converter outlet port 182 to the engine lube supply passage 171 and prevent oil from flowing in the opposite direction.

Describing now a typical operation of the fluid supply system with typical pressure settings, the manual valve 139 prior to engine startup is normally positioned in its neutral position. Then when the engine is started and the pump 127 is thus operating, oil is delivered to the main pressure supply passage 136 which directs it to the regulator valve 138, the neutral-positioned manual valve 139 and the lubricant control valve 140. The pressure regulator valve 138 provides no pressure regulation until the passages are filled with oil and pressure builds to this valve's pressure setting which may be 90 p.s.i., for example. Thus, there is no oil supply to converter 12 until certain events occur as will now be described. Since the manual valve 139 blocks flow in the neutral position, all of the initial oil flow is delivered to the lubricant control valve 140 which is positioned by the spring 168 in the position shown and therefore directs the oil to the engine lube supply passage 171 to lubricate the engine immediately, the valve 181 being closed under such conditions to prevent the oil from entering the converter 12. The pressure regulator setting of the lubricant control valve 140 which setting determines the oil pressure priority for the engine may be at 10 p.s.i. for example, and in that case the valve 140 will remain in the position shown until engine oil pressure reaches 10 p.s.i. When engine oil pressure reaches 10 p.s.i., this pressure which is transmitted to the chamber 176 is effective to move valve element 164 leftward to control the connection of the main pressure supply passage 136 to the engine lube supply passage 171 to allow just enough oil flow to maintain engine oil pressure at 10 p.s.i. With such control of the connection between passages 136 and 171, pressure then increases in the main pressure supply passage 136 to 90 p.s.i. whereafter the pressure regulator valve 138 then regulates to maintain this main pressure. This main pressure regulation is effected by the pressure regulator valve element 151 moving upward to connect the main pressure supply passage 136 to the converter feed passage 161 which then delivers oil to fill converter 12 so that the converter is then conditioned to operate. On filling of the converter 12 oil then flows to the converter outlet port 182 and when the pressure in this port exceeds 10 p.s.i., the valve 181 opens to deliver oil from the converter to the engine lube supply passage 171. With this added oil flow to the engine lube supply passage 171, engine oil pressure again begins to build. The lubricant control valve 140 is calibrated so that when the pressure in the engine lube supply passage 171 exceeds 16 p.s.i., such higher pressure acting in chamber 176 moves valve element sufficiently leftward so that land b blocks the main pressure supply passage 136. The valve 140 is also calibrated for further pressure increase in passage 171 so that when the engine oil pressure reaches a substantially higher pressure value which is the normal operating pressure and may be 35 p.s.i., for example, this pressure acting in chamber 176 moves the valve element 164 sufficiently further leftward to connect the engine lube supply passage 171 to the transmission lube supply passage 178 while continuing to block the main pressure supply passage 136. Thus, the transmission lube supply passage 178 then receives oil from the engine lube supply passage 171 and transmits it to lubricate the transmission components. The pressure regulator bypass valve 179 operates to connect the main pressure supply passage 136 directly to the engine lube supply passage 171 only in the event the lubricant control valve 140 does not for some reason move to its engine lube supply position when engine oil pressure is below 16 p.s.i.

With the engine provided with sufficient oil pressure for its lubrication and the main pressure supply passage having reached its normal regulated pressure, the system is ready for the operator to position the manual valve to establish either forward or reverse drive. Thus, the fluid system according to the present invention directs flow to lubricate the transmission only after the engine requirements have been satisfied, the oil for engine lubrication having been made available immediately after starting of the engine.

The above-described embodiment is illustrative of the invention which may be modified within the scope of the appended claims.

I claim:

1. In combination, an engine, a transmission including a hydrodynamic torque converter, a pump driven by said engine for supplying fluid under pressure, pressure-regulator valve means for regulating the pressure of the fluid supplied by said pump at a predetermined value and delivering any excess fluid to said converter, valve means for delivering fluid from said converter to lubricate said engine and preventing fluid flow in the opposite direction, and lubricant-control valve means for delivering fluid from said pump to lubricate said engine below a predetermined engine lubrication pressure and for blocking fluid flow from said pump to lubricate said engine while delivering fluid from said converter to lubricate said transmission above said predetermined engine lubrication pressure.

2. In combination, an engine, a transmission including a hydrodynamic torque converter, a pump driven by said engine for supplying fluid under pressure, lubricant-control valve means for delivering and controlling fluid flow from said pump to lubricate said engine with a regulated engine lubrication pressure, pressure-regulator valve means for regulating the pump pressure and delivering any excess fluid to said converter, valve means for delivering fluid from said converter to lubricate said engine with increased pressure and preventing fluid flow in the opposite direction, and said lubricant-control valve means being further operable at a predetermined engine lubrication pressure higher than said regulated engine lubrication pressure to block fluid flow from said pump to lubricate said engine while delivering fluid from said converter to lubricate said transmission.

3. In combination, an engine, a transmission including a hydrodynamic torque converter, a pump driven by said engine for supplying fluid under pressure, pressure-regulator valve means for regulating the pressure of the fluid supplied by said pump at a predetermined value and delivering any excess fluid to said converter-check valve means for delivering fluid from said converter to lubricate said engine and preventing fluid flow in the opposite direction, and lubricant-control valve means for controlling fluid delivery to both said engine and said transmission comprising a valve element operable in a first position to deliver fluid from said pump to lubricate said engine and further operable in a second position to block fluid flow from said pump to lubricate said engine while delivering fluid from said converter to lubricate said transmission and further operable between said positions to provide a variable opening for fluid flow from said pump to said engine, spring means for normally biasing said valve element to said first position, said valve element having pressure-responsive means responsive to the pressure of the fluid supplied to said engine to bias said valve element against said spring means toward said second position so that said valve element is held in said first position below a predetermined engine lubrication pressure and is moved towards said second position on engine-lubrication-pressure increase above said predetermined pressure to maintain said engine lubrication pressure at said predetermined pressure and is moved to said second position at a higher predetermined engine lubrication pressure effected by flow from said converter.

* * * * *